United States Patent [19]

Mori et al.

[11] 4,243,621

[45] Jan. 6, 1981

[54] β'-SIALON SINTERED BODY AND A METHOD FOR MANUFACTURING THE SAME

[75] Inventors: Masaaki Mori, Okazaki; Tamotu Ogawa, Kariya; Norihira Takai, Yokohama, all of Japan

[73] Assignee: Toshiba Ceramics Co., Ltd., Tokyo, Japan

[21] Appl. No.: 878,393

[22] Filed: Feb. 16, 1978

[30] Foreign Application Priority Data

Sep. 28, 1977 [JP] Japan .................................. 52-116336
Sep. 28, 1977 [JP] Japan .................................. 52-116337

[51] Int. Cl.$^3$ .............................................. C04B 35/44
[52] U.S. Cl. ..................................... 264/65; 106/73.4; 106/73.5; 264/66; 264/67
[58] Field of Search ................. 106/73.4, 73.5; 264/65, 264/66, 67

[56] References Cited

U.S. PATENT DOCUMENTS

| | | | |
|---|---|---|---|
| 3,991,166 | 11/1976 | Jack et al. | 106/73.4 |
| 4,113,503 | 9/1978 | Lumby et al. | 106/73.4 |

*Primary Examiner*—John A. Parrish
*Attorney, Agent, or Firm*—Bacon & Thomas

[57] ABSTRACT

This invention provides a method for manufacturing said sintered body, comprising preparing a starting material by adding 10 to 1,000 wt. parts of metal silicon powder to 100 wt. parts of mixed powder composed of 20 to 80 wt. % silica powder and 80 to 20 wt. % aluminium powder and mixing said powders thoroughly, further adding, if required, a refractory fine powder of alumina, silicon nitride, aluminium nitride, β'-sialon, aluminium nitride polytype sialon, or silicon carbide, molding the resultant mixture into a green compact, and then sintering said green compact in a nitrogeneous nonoxidative gas atmosphere at a temperature of 1,200° to 1,550° C. This invention further provides a compact sintered body which will be prepared by the above mentioned method.

12 Claims, No Drawings

$\beta'$-SIALON SINTERED BODY AND A METHOD FOR MANUFACTURING THE SAME

BACKGROUND OF THE INVENTION

This invention relates to a method for manufacturing a sintered body mainly composed of $\beta'$-sialon.

Heretofore, there have been proposed various methods for manufacturing sintered bodies having $\beta'$-sialon as a main ingredient. For example, available is a method in which a $\beta'$-sialon-based sintered body is manufactured by sintering a mixed compact formed of silica powder and aluminium powder in a nitrogenous nonoxidative gas atmosphere. According to such conventional method, however, the resultant sintered body is poor in compactness, exhibiting porosity of 40% or more. Moreover, its pore diameter is as large as 0.1 to 10$\mu$, so that it is poor in strength, resistance to oxidation, and chemical stability (especially stability in alkali), as well as in corrosion resistance as against high temperature molten aluminium. Further, the sintered body of the prior art is not suited for a practical use due to its high permeability.

Other conventional methods have also been subject to several shortcomings; cracks at sintering, uneven shrinkage to deteriorate dimensional accuracy, nonhomogeneous construction of sintered bodies which would nullify the outstanding properties peculiar to $\beta'$-sialon.

SUMMARY OF THE INVENTION

An object of this invention, is to provide, in view of eliminating the above shortcomings, a method for manufacturing a sintered body mainly composed of $\beta'$-sialon which is high in resistance to oxidation, chemical stability, and corrosion resistance as against molten nonferrous metals including Al, Zn, Pb, etc., as well as a sintered body mainly composed of $\beta'$-sialon which, besides these properties, has satisfactory compactness and dimensional stability, as well as high strength, hardness, resistance to thermal shock, and thermal resistance.

Basically, this invention provides a method for manufacturing a $\beta'$-sialon-based reaction-sintered body, consisting of preparing a starting material powder by adding 10 to 1,000 wt. parts of metal silicon powder to 100 wt. parts of mixed powder composed of 20 to 80 wt.% silica powder and 80 to 20 wt.% aluminium powder and mixing said powders thoroughly, molding said starting material powder into a green compact, and then sintering said green compact in a nitrogenous nonoxidative gas atmosphere at a temperature of 1,200° to 1,550° C.; and a $\beta'$-sialon sintered body manufactured by such method.

DETAILED DESCRIPTION OF THE PREFERRED EMBODIMENTS

Now this invention will be described in detail.

First, a starting material powder is prepared by adding 10 to 1,000 wt. parts of metal silicon powder to 100 wt. parts of mixed powder composed of 20 to 80 wt.% silica powder and 80 to 20 wt.% aluminium powder and mixing them thoroughly. Then, this starting material powder is molded into a desired shape by various molding methods, such as die press, rubber press, slip casting, and extrusion, and thereafter the resultant green compact is sintered in a nitrogenous nonoxidative gas atmosphere at a temperature of 1,200° to 1,550° C., thereby manufacturing a reaction-sintered body mainly composed of $\beta'$-sialon.

The silica powder available for the invention may be selected from a group including crystal powder, silica sand powder, quartz glass powder, volatile silica, chemicalprecipitation silica, and gas phase method silica. Among these the pulverized volatile silica is best suited for use as the silica powder because it is high in reactivity, producing a lot of $\beta'$-sialon and reducing the sintering time. It is preferable to employ silica powder having a particle size of less than 200 meshes.

Examples of aluminium powder applicable for the invention may be atomized powder (spray powder) and flakelike powder of aluminium, having a particle size of preferably less than 50 meshes.

The metal silicon powder applicable for the invention is preferably of particle size finer than 200 meshes, and may be crystalline or amorphous.

The reason why the ratio of silica powder to aluminium powder ($SiO_2$ powder/Al powder) is limited to the aforesaid range is that if the ratio $SiO_2$ power/Al power is reduced below 20/80 (by weight), some Al will remain unreacted or the yield of AlN and/or Y-phase sialon will be increased, which will naturally lead to reduction in the amount of $\beta'$-sialon produced, prohibiting strong reaction-sintered body from being obtained. Meanwhile, if the ratio $SiO_2$ powder/Al powder exceeds 80/20, then some $SiO_2$ will remain unreacted or the yield of mullite, X-phase, and O'-sialon (solid solution of $Al_2O_3$ in silicon oxynitride ($Si_2ON_2$)) will be increased, thereby inhibiting the properties (strength, corrosion resistance, etc.) of the resultant reaction-sintered body. The preferred ratio of $SiO_2$ powder to Al powder ranges from 63/37 to 50/50.

The reason why the amount of the metal silicon powder mixed relatively to 100 wt. parts of the mixture of silica powder and aluminium powder according to the invention is limited to the aforesaid range is as follows: If the amount of the metal silicon powder mixed is reduced to a level less than 10 wt. parts, there may not fully be attained the desired end, that is, improvement of the properties of the reaction-sintered body. On the other hand, if such amount exceeds 1,000 wt. parts, Si will be fused as the temperature is raised, thereby suppressing the nitriding reaction, so that there will be required a precise control of the sintering conditions, leading to troublesome operation as well as a rise in cost. In this case the mixing ratio of the metal silicon powder to the mixed powder (composed of $SiO_2$ powder and Al powder) should be suitably selected within the aforesaid range, with a view to increasing the yield of $\beta'$-sialon and obtaining a reaction-sintered body of firm construction.

More specifically, when using a mixed powder containing the ratio of $SiO_2$ powder to Al powder at 65/35 and 45/50 (weight %), 10 to 1,000 wt. parts of the metal silicon powder may be mixed to 100 wt. parts of the mixed powder. Further, when using the mixed powder with the ratio $SiO_2$ powder/Al powder ranging from 80/20 to 65/35 or from 45/55 to 20/80 (weight %), 40 to 1,000 wt. parts, preferably 60 to 1,000 wt. parts, of the metal silicon powder may be mixed to 100 wt. parts of the mixed powder.

The nitrogenous nonoxidative gas applicable for the invention may be single nitrogen gas or a mixed nitrogen gas containing an inert gas, such as argon gas and neon gas, or hydrogen gas or ammonia gas.

According to the invention, the sintering temperature is limited to the aforesaid range because a temperature below 1,200° C. will retard the nitriding reaction of the compact to prolong the time required for obtaining the reaction-sintered body, while a temperature exceeding 1,550° C. will volatilize Si, $SiO_2$, or $Si_3N_4$ component to render the sintered body porous or increase the formation of Y-phase sialon making the sintered body liable to crack. The preferred sintering temperature and time are 1,400° to 1,500° C. and 5 to 20 hours respectively.

Thus obtained reaction-sintered body (hereinafter referred to as the sintered body obtained by a first method) may be further embedded in a nonreactive filler powder as it is or after being worked by means of a diamond cutter or grinder at need, and heated in a nonoxidative atmosphere at 1,600° to 1,900° C., and thus there may be obtained a reaction-sintered body mainly composed of $\beta'$-sialon (hereinafter referred to as the sintered body obtained by a second method).

That is, while the aforementioned first method is a method in which the sintered material is caused to react efficiently to produce $\beta'$-sialon and the sintering temperature is limited to 1,200° to 1,550° C., the second method hereof is a method to thicken the produced $\beta'$-sialon compact body by further sintering it. In this case $\beta'$-sialon-based compact is hard to obtain by simply raising the temperature to 1,600° to 1,900° C. due to the partial volatilization as previously mentioned. Therefore, before raising the temperature to 1,600° to 1,900° C., the compact would be embedded in a filler powder resistant to heat and nonreactive as against $\beta'$-sialon.

The nonreactive filler powder used for the second method may, for example, be boron nitride (BN) powder, aluminium nitride (AlN) powder, silicon nitride powder, or graphite.

The nonoxidative gas used for the second method may be single or mixed gas selected from nitrogen gas, ammonia gas, or inert gases such as argon gas and neon gas, for example.

According to the second method, the heating temperature is limited to the aforesaid range, because at a temperature below 1,600° C. it will be difficult to accelerate the formation of solid dissolution of $Al_2O_3$ and AlN with $\beta'$-sialon in the sintered body while a temperature exceeding 1,900° C. will give rise to an increase in the amount of $SiO_2$ and $Si_3N_4$ components volatilized despite that the sintered body is embedded in the filler powder, thereby reducing the amount of $\beta'$-sialon to be produced or increasing Y-phase sialon, and causing formation of a porous degenerated layer on the surface of the sintered body. In this case the preferred heating temperature ranges from 1,700° to 1,750° C. Since this heating temperature is much higher than the aforementioned sintering temperature (1,200° to 1,550° C.), it may be supposed that the Si, $SiO_2$ and $Si_3N_4$ components of the sintered body would be volatilized at the heating step. However, since the compact to be sintered is embedded in the heat-resisting filler powder nonreactive to $\beta'$-sialon, such volatilization is actually inhibited. The reaction-sintered body once obtained at the aforesaid sintering temperature is substantially improved in the thermal stability at a raised temperature, exhibiting hardly any volatilization of the components at the above-mentioned heating temperature (1,600° to 1,900° C.).

In the first method the starting material powder may be prepared by adding a small amount of (0.2 to 10 wt.%) alumina, silicon nitride, aluminium nitride, $\beta'$-sialon, or aluminium nitride polytype sialon fines to the mixture of the silica, aluminium, and metal silicon powders, as occasion demands.

According to a third method, the starting material may be prepared by mixing medium- to coarse-grained alumina, silicon nitride, silicon carbide, $\beta'$-sialon, zirconia, or zircon into the mixture of the silica, aluminium, and metal silicon powders, for the purpose of improving the degree of sintering in the nitriding reaction, as well as the corrosion resistance and resistance to thermal shock, and making possible the manufacture of large-sized products.

That is, the mixed powder composed of silica powder, aluminium powder, and metal silicon powder is mixed with one or more kinds of refractory aggregate powder selected from a group including silicon carbide, alumina, mullite, zircon, zirconia, $\beta'$-sialon, aluminium nitride polytype sialon, and silicon nitride, and the resultant mixture is molded into a desired shape by various molding methods, such as die press, rubber press, slip casting, and extrusion. Then, the resultant green compact is sintered in a nitrogenous nonoxidative gas atmosphere at a temperature of 1,200° to 1,550° C., thereby manufacturing a refractory product containing the refractory aggregate powder bonded with $\beta'$-sialon acting as a bonding matrix.

With a view to improving the close-filling property, the refractory aggregate powder used for the third method is preferably classified into three particle size groups, i.e. coarse (1 mm or more in diameter), medium (0.25–1 mm), and fine (0.25 mm or less). In some cases, clay or other bonding refractory may be mixed as fines. Especially when mixing alumina, mullite, $\beta'$-sialon, aluminium nitride polytype sialon, and silicon nitride for the refractory aggregate powder, solid dissolution is remarkably developed between the nitriding-derived component and the aggregate component, which leads to improved bond between the aggregate and the matrix as well as to refractory products with high corrosion resistance. When using silicon carbide for the refractory aggregate, it is advisable previously to form an oxide film over the surface of the silicon carbide powder, with a view to improving the bond between the aggregate and the matrix composed of $\beta'$-sialon.

The mixture ratio of the mixed bonding powder to refractory aggregate powder according to the third method may be given as follows: 20 to 40 wt.% mixed bonding powder to 80 to 60 wt.% refractory aggregate powder.

As regards the molding conditions, the compact is preferably so molded as to have 25% or higher porosity, with a view to allowing a generous amount of $N_2$ gas to penetrate into the compact for satisfactory nitriding-sintering.

The sintering temperature of the third method is limited to the aforesaid range because a temperature below 1,200° C. will retard the nitriding reaction of the mixed bonding powder to prolong the time required for obtaining the refractory product, while a temperature exceeding 1,550° C. will volatilize Si or $SiO_2$ component in the mixed bonding powder or once produced $Si_3N_4$ component to render the refractory product porous or increase the formation of Y-phase sialon, causing the sintered body liable to crack. In this case the sintering is suitably conducted by raising the temperature at the rate of 100° to 400° C./Hr. to a temperature of 1,400° to 1,500° C. and keeping the temperature for 5 to 10 hours.

Further, according to this third method, the reaction-sintered body after the nitriding reaction may be embedded in a nonreactive filler powder as it is or if desired after being worked by means of a diamond cutter or grinder, and heated in a nonoxidative atmosphere at 1,600° to 1,900° C. With such treatment, solid dissolution and sintering of the bonded phase is promoted to form a more compacted and homogeneous matrix composed of $\beta'$-sialon, and thus there may be obtained a refractory product with further improved corrosion resistance, resistance to oxidation, abrasion resistance, and strength. As for the nonreactive filler powder and nonoxidative gas in the case, they may be the same as those used in the second method.

The heating temperature is limited to the aforesaid range because at a temperature below 1,600° C., it will be difficult to accelerate the formation of solic dissolution of $Al_2O_3$ and $AlN$ with $\beta'$-sialon in the matrix of the reaction-sintered body, while a temperature exceeding 1,900° C. will give rise to an increase in the volatilized amount of $SiO_2$ and $Si_3N_4$ components remaining in the matrix despite that the reaction-sintered body is embedded in the filler powder, thereby reducing the amount of $\beta'$-sialon to be produced or increasing Y-phase sialon, and deteriorating the properties of the refractory product. In this case the preferred heating temperature ranges from 1,700° to 1,750° C. Since this heating temperature is much higher than the aforementioned sintering temperature (1,200° to 1,550° C.), it may be supposed that the Si, $SiO_2$ and $Si_3N_4$ components of the matrix of the reaction-sintered body would be volatilized at the heating step. However, since this reaction-sintered body to be heated is embedded in the highly heat-resisting filler powder nonreactive to the sintered body, such volatilization is actually inhibited. Further, the reaction-sintered body once obtained at the aforesaid sintering temperature is high in the thermal stability at a raised temperature, so that such volatilization of the components would hardly be caused at the above-mentioned heating temperature (1,600° to 1,900° C.).

Moreover, in this invention, the $\beta'$-sialon-based reaction-sintered body obtained by the first or second method may be again pulverized and separated by sieving into three particle size groups - fine, medium- and coarse-grains. A mixture of these grains are molded by the conventional method, and the resultant compact is embedded in a nonreactive filler powder and sintered in a nonoxidative atmosphere, or preferably a nitrogenous atmosphere at a temperature of about 1,600° to 1,900° C., thereby manufacturing a sintered body having $\beta'$-sialon as a main ingredient. In this case the shrinkage of the compact during sintering may be substantially prevented, totally eliminating deformation and cracks and enabling the manufacture of relatively largesized products. Thus, there may be obtained highly compact $\beta'$-sialon-based sintered bodies with extremely low porosity.

Further, according to a fourth method, the $\beta'$-sialon-based material obtained by the first and second methods is pulverized into powder of $\beta'$-sialon-based material with the mean particle size of $1.6\mu$ or less, the powder is molded into a compact with the density of 1.7 g/cm³ or more, then the compact is sintered in a nitrogenous nonoxidative gas atmosphere at a temperature of 1,600° to 1,900° C., and thus a compacted $\beta'$-sialon sintered body may be obtained.

That is, the $\beta'$-sialon-based material powder is prepared by pulverizing the $\beta'$-sialon-based material obtained by the first or second method until the mean particle size (measured by means of a Fischer subsieve sizer) thereof is reduced to $1.6\mu$ or less, preferably $1.2\mu$ or less. The pulverization method may be carried out by wet- or dry-pulverization methods; the former, in which a tungsten carbide or alumina ball mill is filled with alcohol, is more effective in that it requires shorter pulverization time. Subsequently, the powder of $\beta'$-sialon-based material is molded into a desired shape of compact body with the density of 1.7 g/cm³ or more by various molding methods, such as die press, rubber press, slip casting, extrusion, etc., and this compact body is sintered in a nonoxidative or preferably nitrogeneous gas atmosphere (approximately the same pressure as the atmospheric pressure) at a temperature of 1,600° to 1,900° C., thus obtaining a compact $\beta'$-sialon sintered body.

In this fourth method, the particle size of the $\beta'$-sialon-based material powder is limited because a mean particle size exceeding $1.6\mu$ will not secure compact $\beta'$-sialon sintered bodies with low porosity.

The initial density of the compact body is limited because if such density is lower than 1.7 g/cm³, then low porosity, compact $\beta'$-sialon sintered body will not be obtained. As for the nitrogenous nonoxidative gas, it may be single nitrogen gas or a mixture of nitrogen gas and an inert gas, such as argon gas and neon gas.

In this fourth method, the sintering temperature is limited to the aforesaid range because a temperature below 1,600° C. will retard the sintering of the compact to prolong the time required for obtaining the compact $\beta'$-sialon sintered body, while a temperature exceeding 1,900° C. will convert part of $\beta'$-sialon into Y-phase sialon, thereby making it impossible to obtain compacted $\beta'$-sialon sintered bodies with high $\beta'$-sialon content. It is to be desired that such sintering temperature should usually be kept for 1 to 5 hours. If sintering time is shorter than 1 hour, the compact body may not be fully sintered, on the other hand the sintering time exceeding 5 hours would cause overgrowth of grains of the sintered body, deteriorating the properties (especially strength) of the $\beta'$-sialon sintered body obtained. The rate of raising the temperature at sintering should be at 200° C./Hr. or lower, preferably 100° C./Hr. or lower, with a view to inhibiting sudden sintering-shrinkage of the compact body, which would cause cracks or reduction in dimensional accuracy. Further, as the sintering furnace available for sintering there may be used a graphite-lined furnace normally equipped with a graphite resistance heater or high-frequency induction heating graphite susceptor, though such sintering furnace will cause some C0 gas to be produced from the graphite heater at sintering, thereby carbonizing the surface of the obtained sintered body to form a silicon carbide film thereon. Moreover, it is difficult to uniformly sinter the compact body at a fixed temperature, so that the sintered body may be rendered subject to cracks or deformation. In order to solve these problems, the compact body is preferably embedded and sintered in a graphite container filled with a filler powder composed of boron nitride (BN) and aluminium nitride (AlN), put together with the container into the furnace, so as to avoid formation of a silicon carbide film on the surface of the sintered body.

Further, according to the fourth method, sintering of the compact body may be accelerated by employing $\beta'$-sialonbased powder containing 0.5 to 40 wt.% silicon nitride powder and/or aluminium nitride powder. Besides, the grain boundary phase may be modified into a crystalline phase containing $\beta'$-sialon ($Si_{6-Z}Al_ZO_ZN_{8-Z}$; $0<Z\leq 5$), so that there may be obtained $\beta'$-sialon sintered bodies having high degree of compactedness and dimensional stability, as well as satisfactory resistance to alkali, resistance to thermal shock, and mechanical strength. By using the $\beta'$-sialon mixed material powder combining silicon nitride powder with aluminium nitride powder, in particular, the grain boundary phase may be modified into a crystalline phase with high $\beta'$-sialon content, so that there may be obtained a high-quality, compact $\beta'$-sialon sintered body closely resembling a single phase of $\beta'$-sialon and exhibiting high resistance to alkali, resistance to thermal shock, mechanical strength, abrasion resistance, and low-heat expansibility.

In this case the particle size of the silicon nitride powder and aluminium nitride powder ranging from 1 to 5$\mu$ is preferably used.

The mixing ratio of the silicon nitride powder and/or aluminium nitride powder to the $\beta'$-sialon mixed material powder is limited to the aforesaid range because if it is reduced below 0.5 wt.%, acceleration of sintering process, as well as modification of the intergranular bond phase, will not fully be achieved. On the other hand, if the mixing ratio exceeds 40 wt.%, then the structure of the sintered body obtained will involve silicon nitride or Y-phase sialon, leading to deterioration in properties as well as to higher cost.

Meanwhile, the compacted $\beta'$-sialon sintered body may be manufactured also by mixing $\beta'$-sialon-based powder of 1.6$\mu$ or less in particle size and a suitable ratio of medium- and coarse-grains of the compacted $\beta'$-sialon sintered body prepared by the fourth method which has been pulverized and separated by sieving, molding the resultant mixture into a compact body, and then sintering the compact body in a nitrogenous nonoxidative gas atmosphere at 1,600° to 1,900° C.

According to such method, the shrinkage of the compact body during sintering may be minimized, so that the obtained sintered body will never be subject to any deformation or cracks, leading to the possibility of manufacturing largesized products and improvement in dimensional stability, as well as to the manufacture of the compacted $\beta'$-sialon sintered body specially high in resistance to thermal shock.

In the aforesaid fourth method, the sintering process may be conducted in two steps. That is, according to a fifth method of the invention, the $\beta'$-sialon-based material is pulverized into a $\beta'$-sialon-based powder with the mean particle size of 1.6$\mu$ or less, the powder is molded into a compact body having a density of 1.7 g/cm³ or more, and then the compact body is primarily sintered in a nitrogenous nonoxidative gas atmosphere at a temperature of 1,600° to 1,900° C., and further secondly sintered in the same atmosphere at a temperature of 1,500° to 1,750° C. (at least 30° C. lower than the primary-sintering temperature) for 1 hour or more, preferably 4 hours or more.

In this fifth method, the primary-sintering temperature is limited to the aforesaid range because a temperature below 1,600° C. will retard the sintering of the compact body to prolong the time required for obtaining the $\beta'$-sialon sintered body, while a temperature exceeding 1,900° C. will convert part of $\beta'$-sialon into Y-phase sialon, thereby making it impossible to obtain compacted $\beta'$-sialon sintered bodies with high $\beta'$-sialon content. It is to be desired that such primary-sintering temperature should usually be kept for 0.5 to 5 hours. For if the sintering time is shorter than 0.5 hour, the compact body may not be fully sintered, while the sintering time exceeding 5 hours would cause overgrowth of grains of the sintered body, deteriorating the properties (especially strength) of the $\beta'$-sialon sintered body obtained.

Meanwhile, the secondary-sintering temperature is limited to the aforesaid range because a temperature lower than the primary-sintering temperature by only a margin less than 30° C. will cause overgrowth of grains of the sintered body as well as rapid solid-state diffusion, failing to crystallize the grain boundary uniformly as well as to provide the compacted $\beta'$-sialon sintered body with high dimensional stability. If the secondary-sintering temperature is lower than 1,500° C., however, the solid-state diffusion and crystallization of the grain boundary will not fully be achieved. On the other hand, if such temperature exceeds 1,750° C., then the overgrowth of the grains will cause rapid solid-state diffusion to inhibit the uniform crystallization of the grain boundary. Further, the retention time at the secondary-sintering temperature is limited as aforesaid because a time shorter than 1 hour will not be able to afford satisfactory solid-state diffusion and grain boundary crystallization, failing to provide highquality $\beta'$-sialon sintered bodies.

This fifth method is just the same as the fourth method with respect to the conditions excepting the two-step sintering process therein. As previously mentioned, for example, the sintered body may be modified by the addition of the silicon nitride powder and aluminium nitride powder.

Thus, according to this method, part of substances contained in the compact body other than $\beta'$-sialon may be converted into $\beta'$-sialon, and powders in the compact body may be easily sintered together, thereby preventing cracks or deformation by primary-sintering the compact body of fine $\beta'$-sialon-based powder having a prescribed mean particle size and molded into a predetermined density in a nitrogenous nonoxidative gas atmosphere at temperatures limited to a prescribed range, so that there may be obtained a compacted $\beta'$-sialon sintered body with subsantially high $\beta'$-sialon content and good dimensional stability. In the secondary-sintering process, solid-state diffusion is achieved properly to form a compacted crystalline phase while inhibiting the granular growth of the $\beta'$-sialon-based fine powders, and a lot of $\beta'$-sialon is diffused into the grain boundary to form a crystallized phase, thereby substantially modifying the grain boundary. Consequently, the structure becomes a substantially single phase of $\beta'$-sialon, and thus there may be obtained a compacted $\beta'$-sialon sintered body high in chemical stability (especially stability in alkali), thermal resistance, resistance to thermal shock, low-heat expansibility, mechanical strength, and abrasion resistance.

According to a sixth method, the $\beta'$-sialon-based powder pulverized to the mean particle size of 1.6$\mu$ or less as explained in the fourth and fifth methods may, in accordance with the third method, be mixed with one or more kinds of refractory aggregate powder selected from a group including silicon carbide, alumina, mullite, zircon, zirconia, $\beta'$-sialon, aluminium nitride polytype sialon, and silicon nitride, and the resultant mixture is molded into a compact, and then the resultant compact body is sintered in a nitrogenous nonoxidative gas atmosphere at a temperature of 1,600° to 1,900° C.

In this case, the sintering temperature is limited to the aforesaid range because a temperature below 1,600° C. will retard the sintering of the compact body to prolong the time required for obtaining the objective refractory product, while a temperature exceeding 1,900° C. will convert part of $\beta'$-sialon in the $\beta'$-sialon-based powder into Y-phase sialon, thereby failing to provide enough quantity of $\beta'$-sialon for the matrix of aggregate and deteriorating the properties. It is to be desired that such sintering temperature should usually be kept for 1 to 5 hours. For if the retention time is shorter than 1 hour, the compact body may not be fully sintered, while the retention time exceeding 5 hours would cause overgrowth of grains of the $\beta'$-sialon-based material in the compact, deteriorating the properties (especially strength) of the refractory product obtained. The raising rate of temperature at sintering should be at 200° C./Hr. or lower, preferably 100° C./Hr. or lower, with a view to inhibiting rapid sintering-shrinkage of the compact, which would cause cracks or reduction in dimensional accuracy. As for the sintering furnace available for sintering and the sintering conditions, they are the same as those of the fourth method.

Further, in this sixth method, the refractory product having $\beta'$-sialon as a bonding matrix may be manufactured also by mixing 0.5 to 40 wt.% silicon nitride powder and/or aluminium nitride powder having the particle size ranging from approximately 1 to 5$\mu$ with the $\beta'$-sialon-based powder to prepare a $\beta'$-sialon mixed powder, mixing the mixed powder into a refractory aggregate powder, and molding and sintering the resultant mixture. By using such $\beta'$-sialon mixed powder, there may be obtained a refractory product having modified matrix of the refractory aggregate and high degree of compactness and dimensional stability, as well as specially improved resistance to alkali, resistance to thermal shock, and mechanical strength.

Moreover, in this sixth method, the compact body formed of $\beta'$-sialon-based material powder and refractory aggregate powder may be sintered in a nitrogenous nonoxidative atmosphere at a temperature of 1,600° to 1,900° C. (primary-sintering), and then further sintered in the same atmosphere at a temperature at least 30° C. lower than the primary-sintering temperature and ranging from 1,500° to 1,750° C., as occasion demands. Such secondary-sintering will accelerate the solid-state dissolution and sintering of the bond phase to allow the formation of a more compacted and homogeneous matrix composed of $\beta'$-sialon, thereby providing refractory products improved especially in corrosion resistance, resistance to oxidation, abrasion resistance, and strength.

Meanwhile, the fine $\beta'$-sialon-based powder with the mean particle size predetermined as aforesaid is mixed with one of more kinds of refractory aggregate powder selected from a group including silicon carbide, alumina, mullite, zircon, zirconia, $\beta'$-sialon, aluminium nitride polytype sialon, and silicon nitride, and the resultant mixture is molded into a compact, and then the resultant compact is sintered in a nitrogeneous nonoxidative gas atmosphere at a temperature within a prescribed range, and thus the sintering of the fine $\beta'$-sialon-based powder may be facilitated to avoid carcks and deformation, and the addition of the refractory aggregate prevents the sintering-shrinkage to improve the dimensional stability. Further, part of substances in the bond phase other than $\beta'$-sialon may be converted into $\beta'$-sialon during sintering to produce enough quantity of $\beta'$-sialon for the aggregate matrix, and solid solution may be formed between the matrix and aggregate components substantially to strengthen the bond between them, enhancing the outstanding properties of the $\beta'$-sialon itself. As a result, there may be obtained refractory products with $\beta'$-sialon as the bonding matrix, exhibiting high strength, abrasion resistance, corrosion resistance as against molten metals, resistance to oxidation, acid resistance, and resistance to alkali. In addition, the mixture of the aggregate will prevent the sintering-shrinkage to improve the dimensional stability, so that manufacture of large-sized refractory products may be made possible.

According to this invention, there will be obtained a compacted reaction-sintered body mainly composed of $\beta'$-sialon, which has satisfactory dimensional stability and outstanding resistance to oxidation, chemical stability (especially stability in alkali), and corrosion resistance as against molten ferrous and nonferrous metals including Al, Zn, Pb, etc., as well as high strength, hardness, resistance to thermal shock, and thermal resistance.

Although the mechanism of the formation of the reaction-sintered body with these excellent properties according to the invention has not been definitely known yet, studies made by the inventor hereof indicate that the sintered body may be formed as follows:

(i) At temperature below 1,000° C.:

$$3SiO_2 + 4Al \rightarrow 3Si + 2Al_2O_3, \quad (I)$$

$$2Al + N_2 \rightarrow 2AlN. \quad (II)$$

(ii) At temperature of 1,000° C. and above:

$$3Si + 2N_2 \rightarrow \beta\text{-}Si_3N_4, \quad (III)$$

Solid solution of $$Al_2O_3 \text{ and AlN in } \beta\text{-}Si_3N_4 \rightarrow \beta'\text{-sialon}. \quad (IV)$$

That is, at temperatures below 1,000° C., the aluminium powder, having the melting point of 660° C., melts and penetrates into the spaces among the silica powder and metal silicon powder, forming highly active Si as given by Formula (I) when brought in close contact with $SiO_2$. At the same time, the aluminium powder is caused to become AlN at about 600° C. by a nitriding reaction as given by Formula (II), while part of the aluminium powder is covered with AlN, remaining as it is even at temperatures exceeding 660° C. The reactions given by Formulas (I) and (II) are exothermic reactions by which the compact temperature is raised to accelerate the subsequent reactions of Formulas (III) and (IV).

Meanwhile, at temperatures of 1,000° C. and above, the metal silicon powder in the compact body is separated by $Al_2O_3$ and AlN crystals formed in accordance with the reactions of Formulas (I) and (II), so that it may be prevented from fusing even if the generation of heat by the reactions of Formulas (I), (II) and (III) raises the temperature above the melting point of Si (1,420° C.). In addition, the Si formed according to the reaction (I) is highly active and fine, so that it may easily be nitrided to become $\beta\text{-}Si_3N_4$ as given by Formula (III), thereby accelerating the separation of the initially mixed metal silicon powder and preventing the metal silicon powder from being fused (I). Accordingly, the initially mixed metal silicon powder may be kept in the powdered state without fusing internally or without being united to Si generated, ensuring the efficient nitriding reaction as given by Formula (III) to form—$Si_3N_4$, thereby producing a sufficient amount of—$Si_3N_4$ and substantially reducing the rate of Si remaining unreacted.

Subsequently, the $Al_2O_3$ and AlN formed in the reaction (I) and a sufficient amount of $\beta$-$Si_3N_4$ formed in the reaction (III) react each other and make a solid solution in accordance with Formula (IV), to form $\beta'$-sialon.

Thus, according to this invention, there may be easily and efficiently obtained a reaction-sintered body mainly composed of $\beta'$-sialon which has such various properties as aforesaid, on the basis of the reactions as given by Formulas (I) to (IV).

Moreover, as in the aforementioned second method, the sintering process as well as the solid solution of $Al_2O_3$ and AlN in—$Si_3N_4$ may be accelerated to increase the amount of $\beta'$-sialon formed by embedding the sintered body in the nonreactive filler powder and further heating it in the nonoxidative atmosphere at 1,600° to 1,900° C., so that there may be obtained reaction-sintered bodies additionally improved especially in the degree of compactness, dimensional stability, resistance to oxidation, and strength among other properties as aforementioned.

According to the invention, as has been described in detail, there is provided a refractory product having $\beta'$-sialon as a basic component which has high abrasion resistance, corrosion resistance as against molten metals, resistance to oxidation, acid resistance, and resistance to alkali. More specifically, according to the 2nd, 4th and 5th methods of this invention, there will be provided a refractory product which is free from any cracks during sintering and very low in porosity. Further, according to the 3rd and 6th method of this invention, there will be provided a refractory product having $\beta'$-sialon as the bonding matrix, which has an improved resistance to thermal shock and dimensional stability that have been the weak points of the prior art $\beta'$-sialon sintered refractory products, and which may be formed in a large shape and is useful for a wide range of applications, such as refractory products for molten nonferrous metals as well as for smelting.

Accordingly, the sintered refractory products of the invention may be applied to the wide variety of fields given as follows:

(1) Refractory products for molten nonferrous metals:

Lining materials for blast furnaces, lining materials for transportation pipes for molten nonferrous metals, protective pipes for thermocouples for measuring the temperatures of molten nonferrous metals, stokes for low-pressure casting, nozzles for continuous casting, insert nozzles for tap holes, flow regulating valves for molten nonferrous metals, sliding members for pumps for molten nonferrous metals (hot chamber pistons, cylinders, goose necks, etc.), crucibles for melting semiconductors such as germanium and silicon, etc.

(2) Refractory products for smelting:

Nozzles for continuous casting, plates for sliding nozzles, immersion pipes, etc.

(3) Machine parts:

Piston heads and cylinders for regenerators and piston engines, combustion chamber members for gas turbine engines (rotors, stators, shrouds, etc.), rocket nozzles, etc.

(4) Corrosion resisting materials:

Acid and alkali resisting containers, transportation pipes for chlorine or hydrogen sulfide gas, blast tubes for basic gas, lining materials for sintering furnaces for plastics, etc.

Now there will be described Examples of this invention.

EXAMPLES 1 TO 4

Variously combined starting material powders as shown in Table 1 were separately dry-mixed by means of a V-mixer, and molded into green compacts measuring 10(W)×100(L)×10(H) mm by rubber press (1 ton/cm$^2$). Then, the green compacts were heated in a nitrogen atmosphere to 1,450° C. at a rate of 100° C./Hr., and sintered at the same temperature kept for 10 hours, and thus obtained were 4 types of reaction-sintered bodies having $\beta'$-sialon as the main component.

Meanwhile, a starting material was prepared as a control by mixing fine powder of volatile silica with atomized Al powder (250-mesh) by means of the V-mixer, and molded into a green compact measuring 10(W)×100(L)×10(H) mm by rubber press (1 ton/cm$^2$). The green compact was heated in the nitrogen atmosphere to 1,500° C. at a rate of 40° C./hr., and sintered at the same temperature for 10 hours, and thus obtained was a reaction-sintered body having $\beta'$-sialon as the main component.

Then examined were the properties of the reaction-sintered bodies mainly composed of $\beta'$-sialon which had been prepared in Examples 1 to 4 as well as in the comparative example. The results of such examination are shown in Table 1.

TABLE 1

|  | Example 1 | Example 2 | Example 3 | Example 4 | Control 1 |
|---|---|---|---|---|---|
| **Starting material powder*[1]** | | | | | |
| Volatile silica fines | 30 | 50 | 60 | 70 | 60 |
| Atomized Al powder (250-mesh) | 70 | 50 | 40 | 30 | 40 |
| Metal silicon powder (250-mesh) | 70 | 50 | 50 | 180 | — |
| Properties | | | | | |
| Apparent porosity (%) | 11 | 22 | 18 | 28 | 41 |
| Bulk specific gravity | 2.5 | 2.4 | 2.6 | 2.1 | 1.9 |
| $\beta'$-sialon content (%) | 60 | 80 | 95 | 60 | 80 |
| Bending strength (kg/cm$^2$) | 950 | 1,120 | 1,240 | 770 | 380 |
| Molten Al immersion (at 1,000° C. for 5 days) | Minimal erosion | No erosion | No erosion | No erosion | Formation of black reaction layer (1 to 2mm thick) |
| Molten Cu immersion (at 1,300° C. for 5 hrs.) | Minimal erosion | No erosion | No erosion | No erosion | Formation of surface-reaction layer |

Undiluted hydrochloric acid

TABLE 1-continued

|  | Example 1 | Example 2 | Example 3 | Example 4 | Control 1 |
|---|---|---|---|---|---|
| immersion (5 hours' boiling)*2 | −5 | 0 | 0 | −6 | −17 |
| Undiluted sulfuric acid immersion (5 hours' boiling)*2 | −1 | +0.2*3 | +0.2*3 | −1 | −2 |
| 50% aqueous solution of NaOH (5 hours' boiling)*2 | −5.1 | −0.6 | 0 | −13 | −71 |
| Oxidation-induced increase in weight (mg/cm$^2$) by heating in air at 1,200° C. for 40 hrs. | 33 | 16 | 14 | 23 | 39 |

*1: The quantity of each ingredient of starting material powder is given by wt. parts.
*2: Variation in weight (wt.%).
*3: The increase in weight is attributable to sulfate radicals adsorbed, exhibiting hardly any erosion.

As may be clear from Table 1, the reaction-sintered bodies prepared according to this invention are substantially superior to the one obtained by the conventional method in all of the properties including $\beta'$-sialon content, strength, chemical stability, and resistance to oxidation.

EXAMPLES 5 TO 6

The reaction-sintered bodies of Examples 2 and 3 were separately embedded in a filler powder composed of 60 wt.% silicon nitride and 40 wt.% boron nitride placed in a graphite container, heated in the nitrogen atmosphere to 1,700° C. at a rate of 200° C./Hr., and kept at the temperature for 4 hours. Thereafter, the reaction-sintered bodies were gradually cooled at a rate of 200° C./Hr., and thus obtained were sintered bodies as intended. The properties of these sintered bodies obtained were found to be such as shown in Table 2.

TABLE 2

| Properties | Example 5 | Example 6 |
|---|---|---|
| Apparent porosity (%) | 9.2 | 7.7 |
| Bulk specific gravity | 2.6 | 2.7 |
| $\beta'$-sialon content (%) | 90 | ≈100 |
| Bending strength (kg/cm$^2$) | 1,030 | 1,180 |
| Molten Al immersion (at 1,000° C. for 5 days) | No erosion | No erosion |
| Molten Cu immersion (at 1,300° C. for 5 hrs.) | No erosion | No erosion |
| Undiluted hydrochloric acid immersion (5 hours' boiling)* | 0 | 0 |
| Undiluted sulfuric acid immersion (5 hours' boiling)* | | 0 |
| 50% aqueous solution of NaOH (5 hours' boiling) | −0.3 | 0 |
| Oxidation-induced increase in weight (mg/cm$^2$) by heating in air at 1,200° C. for 40 hrs. | 11 | 8 |

*Variation in weight (wt.%).

As may be clear from Table 2, the sintered bodies obtained by further heating the reaction-sintered bodies (Examples 2 and 3) which had once been sintered are substantially improved in $\beta'$-sialon content, compactedness, stability in alkali, and resistance to oxidation as compared with the ones prior to heating.

EXAMPLE 7

Mixed bonding powder with composition and silicon carbide powder having particle size distribution as shown in Table 3 were mixed together by means of the V-mixer, and molded into a large-sized compact measuring 200(W)×200(L)×20(H) mm by rubber press (1 ton/cm$^2$). Then, the compact was heated in the nitrogen atmosphere to 1,450° C. at a rate of 10° C./Hr., and nitriding-sintered at the temperature for 10 hours, and thus obtained was a refractory product having $\beta'$-sialon as the bonding matrix.

The properties of the refractory product obtained were found to be such as shown in Table 3.

TABLE 3

|  |  | Example 7 |
|---|---|---|
| Material powder |  |  |
| Mixed bonding powder | Volatile silica fines | 14(wt. %) |
|  | Atomized Al powder (250-mesh) | 9 |
|  | Metal silicon powder (250-mesh) | 12 |
| Silicon carbide powder | Particle size: 3–1mm | 5 |
|  | Particle size: 1–0.25mm | 40 |
|  | Particle size: less than 0.25mm | 20 |
| Properties |  |  |
| Apparent porosity (%) |  | 19 |
| Bulk specific gravity |  | 2.58 |
| Shrinkage percentage at sintering (%) |  | 0.1 |
| Bending strength (kg/cm$^2$) |  | 350 |
| Molten Al immersion (at 1,000° C. for 5 days) |  | No erosion |
| Molten Cu immersion (at 1,300° C. for 5 hrs.) |  | No erosion |
| Undiluted hydrochloric acid immersion* (5 hours' boiling) |  | −0.9 |
| Undiluted sulfuric acid immersion* (5 hours' boiling) |  | 0 |
| 50% aqueous solution of NaOH* (5 hours' boiling) |  | −0.7 |
| Oxidation-induced increase in weight (mg/cm$^2$) by heating in air at 1,200° C. for 40 hrs. |  | 7 |

*Variation in weight (wt.%).

As may be clear from Table 3, the refractory product of the invention is highly outstanding in all the properties including strength, dimensional stability, corrosion resistance as against molten metals, chemical stability, and resistance to oxidation. Further, even with a large size, it suffered no cracks, exhibiting general homogeneity.

EXAMPLE 8

Mixed bonding powder with composition alumina powder having particle size distribution as shown in Table 4 were mixed together by means of the V-mixer, and molded into a large-sized compact measuring 80(W)×250(L)×20(H) mm by rubber press (1 ton/cm$^2$). Then, the compact was nitriding-sintered under the same conditions as those of Example 7, and thus obtained was a refractory product having $\beta'$-sialon as the bonding matrix.

The properties of the refractory product obtained were found to be such as shown in Table 4.

TABLE 4

|  |  | Example 8 |
|---|---|---|
| Material powder |  |  |
| Mixed bonding powder | Volatile silica fines | 10(wt. %) |
|  | Atomized Al powder (250-mesh) | 7 |
|  | Metal silicon powder (250-mesh) | 8 |

TABLE 4-continued

| | | Example 8 |
|---|---|---|
| Alumina powder | Particle size: 3–1mm | 35 |
| | Particle size: 1–0.25mm | 25 |
| | Particle size: less than 0.25mm | 15 |
| Properties | | |
| Apparent porosity (%) | | 22 |
| Bulk specific gravity | | 2.67 |
| Shrinkage percentage at sintering (%) | | 0.3 |
| Bending strength (kg/cm$^2$) | | 310 |
| Molten Al immersion (at 1,000° C. for 5 days) | | No erosion |
| Molten Cu immersion (at 1,300° C. for 5 hrs.) | | No erosion |
| Molten SUS 304 immersion (at 1,630° C. for 3 hrs.) | | Depth of erosion <1mm |
| Undiluted hydrochloric acid immersion* (5 hours' boiling) | | −0.4 |
| Undiluted sulfuric acid immersion* (5 hours' boiling) | | 0 |
| 50% aqueous solution of NaOH* (5 hours' boiling) | | −0.5 |
| Oxidation-induced increase in weight (mg/cm$^2$) by heating in air at 1,200° C. for 40 hrs. | | 5 |

*Variation in weight (wt.%).

EXAMPLES 9 AND 10

The refractory products (reaction-sintered bodies) of Examples 7 and 8 were embedded in nonreactive filler powder composed of 60 wt.% of silicon nitride and 40 wt.% of boron nitride placed in a graphite container, heated in the nitrogen atmosphere to 1,700° C. at a rate of 200° C./Hr., and kept at the temperature for 4 hours. Thereafter, the refractory products were gradually cooled at a rate of 200° C./Hr., and thus obtained were refractory products with $\beta'$-sialon as the bonding matrix as intended.

The properties of these refractory products obtained were found to be such as shown in Table 5.

TABLE 5

| Properties | Example 9 | Example 10 |
|---|---|---|
| Apparent porosity (%) | 10 | 9 |
| Bulk specific gravity | 2.70 | 2.85 |
| Shrinkage percentage at sintering (%) | 5.0 | 5.4 |
| Bending strength (kg/cm$^2$) | 380 | 410 |
| Molten Al immersion (at 1,000° C. for 5 days) | No erosion | No erosion |
| Molten Cu immersion (at 1,300° C. for 5 hrs.) | No erosion | No erosion |
| Undiluted hydrochloric acid immersion (5 hours' boiling)* | −0.7 | −0.1 |
| Undiluted sulfuric acid immersion (5 hours' boiling)* | 0 | 0 |
| 50% aqueous solution of NaOH (5 hours' boiling)* | −0.3 | −0.3 |
| Oxidation-induced increase in weight (mg/cm$^2$) by heating in air at 1,200° C. for 40 hrs. | 4.8 | 3.2 |

*Variation in weight (wt.%).

As may be clear from Table 5, the refractory products of Examples 9 and 10 are further improved in compactness, strength, and resistance to oxidation as compared with the refractory products of Examples 7 and 8 which were obtained only by the aforesaid sintering process.

EXAMPLES 11 AND 12 AND CONTROL 2

The same starting material powder as that of Example 3 was molded into tubular green compacts with wall thickness of 2.5 cm by rubber press (1 ton/cm$^2$). Then, the green compacts were heated in the nitrogen atmosphere to 1,500° C. at a rate of 200° C./Hr., and kept at the temperature for 10 hours, and thus prepared were $\beta'$-sialon-based materials. An examination of these $\beta'$-sialon-based materials by the X-ray powder method revealed that they are mostly composed of $\beta'$-sialon, exhibiting large peaks for $\beta'$-sialon and small peaks for $\alpha$-Al$_2$O$_3$.

Then, the $\beta'$-sialon-based materials were previously roughly crushed by means of a jaw crusher, and subsequently pulverized by means of a hammer crusher. Thereafter, the pulverized powder was (1) further pulverized for 70 hours by the wet-pulverization method employing an alumina ball mill containing alcohol, and (2) pulverized for 24 hours by the wet-pulverization method, thereby preparing $\beta'$-sialon-based material powder with the mean particle size of 1.2$\mu$ (Example 11) and $\beta'$-sialon-based material powder with the mean particle size of 1.6$\mu$ (Example 12) respectively. As Control 2 $\beta'$-sialon-based material powder with the mean particle size of 1.8$\mu$ was prepared by (3) pulverizing the aforesaid pulverized powder for 24 hours by the dry-pulverization method employing the alumina ball mill.

Thereafter, these three types of $\beta'$-sialon-based powder were each mixed with 7.5 wt.% vinyl acetate, passed through a 50-mesh nylon sieve for granulation, once dried, and then molded into three platelike compacts (measuring 40W×70L×9T mm) by die press under a pressure of 550 kg/cm$^2$. These compacts were heated in the air at 400° C. for 12 hours to volatilized and remove the binder (vinyl acetate). The densities of the compacts after such removal were examined, and they were found to be 1.92 g/cm$^3$ (Example 11), 1.95 g/cm$^3$ (Example 12), and 1.94 g/cm$^3$ (Control 2). Then, these compacts were respectively embedded in filler powder consisting of 60% by weight of silicon nitride and 40% by weight of boron nitride placed in graphite containers, put together with these containers into a sintering furnace, heated in a nitrogen atmosphere to 1,750° C. at a rate of 400° C./Hr., and sintered at the same temperature kept for 4 hours, and thus obtained were three types of $\beta'$-sialon sintered bodies.

Examinations of the obtained three $\beta'$-sialon sintered bodies by the X-ray powder method revealed only a peak for $\beta'$-sialon, for all of the sintered bodies of Examples 11 and 12 and a peak for $\beta'$-sialon as well as a small peak for $\alpha$-Al$_2$O$_3$ for the sintered body of Control 2. The porosities of the $\beta'$-sialon sintered bodies were examined. As a result, the sintered bodies of Examples 11 and 12 exhibited porosities at 4.0% and 10.2% respectively to prove their high degree of compactness, while that of Control 2 was found to have its porosity at as high as 24.6%. It may be seen from this that the mean particle size of the $\beta'$-sialon-based material powder significantly affects the compactedness of the $\beta'$-sialon sintered body obtained.

Meanwhile, tests on the $\beta'$-sialon sintered body of Example 11 were conducted as follows:
 (A) 5 days' immersion in molten aluminum at 1,000° C.;
 (B) 3 hours' immersion in molten copper at 1,300° C.;
 (C) respective 5 hours' boiling immersion in undiluted sulfuric acid and undiluted hydrochloric acid; and
 (D) 40 hours' heating in the air at 1,200° C.

As a result, the $\beta'$-sialon sintered body exhibited no erosion with tests (A) to (C), while the oxidation-induced increase in weight in test (D) was as low as 4.5 mg/cm$^2$.

EXAMPLE 13 AND CONTROLS 3 AND 4

The $\beta'$-sialon-based material powder (mean particle size 1.2$\mu$) used in Example 11 was mixed with vinyl acetate, granulated by means of the 50-mesh sieve, once dried, and then molded into three platelike compacts (measuring 40 W×70 L×9 T mm) by die press under pressures of 600 kg/cm$^2$ (Example 13), 110 kg/cm$^2$ (Control 3) and 55 kg/cm$^2$ (Control 4). These compacts were heated in the air at 400° C. for 12 hours to volatilize and remove the binder (vinyl acetate). The densities of the compacts after such removal were examined, and they were found to be 1.92 g/cm$^3$ (Example 13), 1.68 g/cm$^3$ (Control 3) and 1.53 g/cm$^3$ (Control 4). Then, these compacts were sintered by the same method as in Example 11, and thus obtained were three types of $\beta'$-sialon sintered bodies.

The porosities of the obtained $\beta'$-sialon sintered bodies were examined. As a result, the sintered body of the invention (Example 13) exhibited a porosity at 3.6% to prove its high degree of compactedness, while those of Controls 3 and 4 were found to have their respective porosities at as high as 12.3% and 28.3%. It may be seen from this that the density of the compact also significantly affects the compactedness of the $\beta'$-sialon sintered body obtained.

The corrosion resistance, acid resistance, and resistance to oxidation of the $\beta'$-sialon sintered body of Example 13 were examined in accordance with the testing procedures (A) to (D), and this sintered body, like that of Example 11, was found to have satisfactory properties.

EXAMPLE 14

The $\beta'$-sialon-based material obtained in Example 2 was previously roughly crushed by means of the jaw crusher, and subsequently pulverized by means of the hammer crusher. Thereafter, the pulverized powder was further pulverized for 96 hours by the wet-pulverization method employing a tungsten carbide ball mill containing alcohol, thereby preparing $\beta'$-sialon-based powder having the mean particle size of 0.7$\mu$. Thereafter, this $\beta'$-sialon-based powder was mixed with vinyl acetate in the same manner as in Example 11, granulated, and molded by die press (550 kg/cm$^2$). The binder in the resultant molded body was volatilized and removed, and thus prepared was a compact with the density of 1.86 g/cm$^3$. Then, this compact was embedded in filler powder consisting of 60% by weight of silicon nitride and 40% by weight of boron nitride placed in a graphite container, put together with the container into the sintering furnace, heated in a nitrogen atmosphere to 1,750° C. raising the temperature at a rate of 400° C./Hr., and sintered at the same temperature kept for 3 hours, and thus obtained was a $\beta'$-sialon sintered body.

The obtained $\beta'$-sialon sintered body was identified by the X-ray powder method, and it was found to contain $\beta'$-sialon, plus a minimal amount of $\beta$-Al$_2$O$_3$. This $\beta'$-sialon sintered body exhibited a porosity at 0.4% to prove its high degree of compactedness.

EXAMPLE 15

The $\beta'$-sialon-based material powder (mean particle size 1.2$\mu$) used in Example 11 was mixed with 10 wt.% 300-mesh silicon nitride powder to prepare $\beta'$-sialon mixed material powder, which was molded in the same manner as in Example 11 (compact density 1.92 g/cm$^3$), and sintered, and thus obtained was a $\beta'$-sialon sintered body.

The obtained $\beta'$-sialon sintered body was identified by the X-ray powder method, and it was found to be substantially composed of $\beta'$-sialon alone. This $\beta'$-sialon sintered body exhibited a porosity at 2.7% to prove its very high degree of compactedness. Further, the $\beta'$-sialon sintered body was boiled in 50% aqueous solution of NaOH for 5 hours, and the reduction in weight examined proved to be 2.4%, indicating high resistance to alkali.

EXAMPLE 16

The $\beta'$-sialon-based material powder (mean particle size 1.2$\mu$) used in Example 11 was mixed with 10 wt.% 325-mesh silicon nitride powder and 3 wt.% 250-mesh aluminum nitride powder to prepare $\beta'$-sialon mixed material powder, which was molded in the same manner as in Example 11 (compact density 1.91 g/cm$^3$), and sintered, and thus obtained was a $\beta'$-sialon sintered body.

The obtained $\beta'$-sialon sintered body was identified by the X-ray powder method, and it was found to be substantially composed of $\beta'$-sialon alone. This $\beta'$-sialon sintered body exhibited a porosity at 2.2% to prove its very high degree of compactedness. Further, the $\beta'$-sialon sintered body was boiled in 50% aqueous solution of NaOH for 5 hours, and the reduction in weight examined proved to be 1.4%, indicating very high resistance to alkali.

EXAMPLES 17 AND 18 AND CONTROL 5

Compacts obtained by molding the $\beta'$-sialon-based material powder in the same manner as in Examples 11 and 12 and Control 2 were respectively embedded in filler powder consisting of 60% by weight of silicon nitride and 40% by weight of boron nitride placed in graphite containers, put together with these containers into the sintering furnace, heated in a nitrogen atmosphere to 1,730° C. at a rate of 400° C./Hr., primarily-sintered at the same temperature kept for 2 hours, and secondly-sintered in the same atmosphere at a temperature of 1,680° C. kept for 10 hours, and thus obtained were three types of $\beta'$-sialon sintered bodies.

The obtained $\beta'$-sialon sintered bodies were identified by the X-ray powder method, and it was found that the $\beta'$-sialon sintered bodies of Examples 17 and 18 contains only $\beta'$-sialon, while that of Control 5 contains $\beta'$-sialon and a small amount of $\alpha$-Al$_2$O$_3$. The porosities of the $\beta'$-sialon sintered bodies were examined. As a result, the sintered bodies of Examples 17 and 18 exhibited porosities at 2% and 6% respectively to prove their high degree of compactedness, while that of Control 5 was found to have its porosity at as high as 13%. It may be seen from this that the mean particle size of the $\beta'$-sialon-based material powder significantly affects the compactedness of the $\beta'$-sialon sintered body obtained.

Meanwhile, tests on the $\beta'$-sialon sintered body of Example 17 were conducted as follows:
(A) 5 days' immersion in molten aluminium at 1,000° C.;
(B) 3 hours' immersion in molten copper at 1,300° C.;
(C) respective 5 hours' boiling immersion in undiluted sulfuric acid and undiluted hydrochloric acid;
(D) 40 hours' heating in the air at 1,200° C.; and
(E) 5 hours' boiling in 50% aqueous solution of NaOH.

As a result, the $\beta'$-sialon sintered body of the invention exhibited no erosion with tests (A) to (C), while the oxidation-induced increase in weight in test (D) was as low as 3.5 mg/cm$^2$. Further, the reduction in weight in test (E) was 1.7%, indicating very high resistance to alkali.

EXAMPLE 19 AND CONTROLS 6 AND 7

The $\beta'$-sialon-based powder (mean particle size 1.2$\mu$) used in Example 11 was mixed with vinyl acetate, passed through the 50-mesh nylon sieve for granulation, and then molded into three platelike compacts (measuring 40 W×70 L×9 T mm) by die press under pressures of 600 kg/cm$^2$ (Example 19), 110 kg/cm$^2$ (Control 6) and 55 kg/cm$^2$ (Control 7). These compacts were heated in the air at 400° C. for 12 hours to volatilize and remove the binder (vinyl acetate). The densities of the compacts after such removal were examined, and they were found to be 1.92 g/cm$^3$ (Example 19), 1.68 g/cm$^3$ (Control 6) and 1.53 g/cm$^3$ (Control 7). Then, these compacts were sintered in two-steps, i.e. primary- and secondary-sintering by the same method as in Example 17, and thus obtained were three types of $\beta'$-sialon sintered bodies.

The porosities of the obtained $\beta'$-sialon sintered bodies were examined. As a result, the sintered body of the invention (Example 19) exhibited a porosity at 2% to prove its high degree of compactedness, while those of Controls 6 and 7 were found to have their respective porosities at as high as 10% and 19%. It may be seen from this that the density of the compact also significantly affects the compactedness of the $\beta'$-sialon sintered body obtained.

The corrosion resistance, acid resistance, resistance to oxidation, and resistance to alkali of the $\beta'$-sialon sintered body of Example 19 were examined in accordance with the testing procedures (A) to (E), and this sintered body, like that of Example 17, was found to have satisfactory properties.

EXAMPLE 20

The $\beta'$-sialon-based material obtained in Example 3 was previously roughly crushed by means of the jaw crusher, and subsequently pulverized by means of the hammer crusher. Thereafter, the pulverized powder was further pulverized for 96 hours by the wet-pulverization method employing the tungsten carbide ball mill containing alcohol, thereby preparing $\beta'$-sialon-based powder with the mean particle size of 0.7$\mu$. Thereafter, this $\beta'$-sialon-based powder was mixed with vinyl acetate in the same manner as in Example 11, granulated, and molded by die press (550 kg/cm$^2$). The binder in the resultant molded body was volatilized and removed, and thus prepared was a compact with the density of 1.86 g/cm$^3$. Then, this compact was embedded in filler powder consisting of silicon nitride and boron nitride placed in a graphite container, put together with the container into the sintering furnace, heated in a nitrogen atmosphere to 1,700° C. raising the temperature at a rate of 180° C./Hr., primarily-sintered at the same temperature kept for 3 hours, and secondly-sintered in the same atmosphere at a temperature of 1,550° C. kept for 15 hours, and thus obtained was a $\beta'$-sialon sintered body.

The obtained $\beta'$-sialon sintered body was identified by the X-ray powder method, and it was found to contain $\beta'$-sialon, plus a minimal amount of $\alpha$-Al$_2$O$_3$. This $\beta'$-sialon sintered body exhibited a porosity at 2% to prove its high degree of compactedness. The corrosion resistance, resistance to oxidation, and resistance to alkali of this $\beta'$-sialon sintered body were examined in accordance with the testing procedures (A) to (E), and the sintered body, like that of Example 17, was found to have satisfactory properties.

EXAMPLE 21

The $\beta'$-sialon-based powder (mean particle size 1.2$\mu$) used in Example 11 was mixed with 10 wt.% 300-mesh silicon nitride powder to prepare $\beta'$-sialon mixed powder, which was molded in the same manner as in Example 11 (compact density 1.92 g/cm$^3$), and primary- and secondary-sintered, and thus obtained was a $\beta'$-sialon sintered body.

The obtained $\beta'$-sialon sintered body was identified by the X-ray powder method, and it was found to be substantially composed of $\beta'$-sialon alone. This $\beta'$-sialon sintered body exhibited a porosity at 1% to prove its very high degree of compactedness. Further, the corrosion resistance, resistance to oxidation, and resistance to alkali of this $\beta'$-sialon sintered body were examined in accordance with the testing procedures (A) to (D). As a result, the $\beta'$-sialon sintered body of the invention was found not to be eroded by molten metal or acid, exhibiting low oxidation-induced reduction in weight. Moreover, the reduction in weight by 50% aqueous solution of NaOH was as low as 1.5%, indicating very high resistance to alkali.

EXAMPLE 22

The $\beta'$-sialon-based material powder (mean particle size 1.2$\mu$) used in Example 11 was mixed with 10 wt.% 325-mesh silicon nitride powder and 3 wt.% 250-mesh aluminium nitride powder to prepare $\beta'$-sialon mixed powder, which was molded in the same manner as in Example 11 (compact density 1.91 g/cm$^3$), and primarily- and secondly-sintered, and thus obtained was a $\beta'$-sialon sintered body.

The obtained $\beta'$-sialon sintered body was identified by the X-ray powder method, and it was found to be composed of a single phase of $\beta'$-sialon. This $\beta'$-sialon sintered body exhibited a porosity at 1% to prove its very high degree of compactedness. Further, the corrosion resistance, acid resistance, resistance to oxidation, and resistance to alkali of this $\beta'$-sialon sintered body were examined in accordance with the testing procedures (A) to (E). As a result, the $\beta'$-sialon sintered body of the invention was found not to be eroded by molten metal or acid, exhibiting low oxidation-induced reduction in weight. Moreover, the reduction in weight by 50% aqueous solution of NaOH was as low as 1.3%, indicating very high resistance to alkali.

EXAMPLE 23

The $\beta'$-sialon-based material obtained in Example 3 was previously roughly crushed by means of the jaw crusher, and subsequently pulverized by means of the hammer crusher. Thereafter, the pulverized powder was further pulverized for 70 hours by the wet-pulverization method employing the alumina ball mill containing alcohol, thereby preparing $\beta'$-sialon-based material powder with the mean particle size of 1.2$\mu$.

Then, this $\beta'$-sialon-based powder and silicon carbide powder having particle size distribution were mixed at the ratio as shown in Table 6, kneaded fully with a small amount of water added thereto, and molded into a large-sized cylindrical compact measuring 50$\phi$×200(L) mm by rubber press (1 ton/cm$^2$). Then, the compact was embedded in a mixed powder of boron nitride and silicon nitride, heated in the nitrogen atmosphere to 1,750° C. at a rate of 100° C./Hr., and sintered at the temperature for 3 hours, and thus obtained was a refractory product having $\beta'$-sialon as the bonding matrix.

The properties of the refractory product obtained were found to be such as shown in Table 6.

TABLE 6

|  |  | Example 1 |
|---|---|---|
| Material powder | | |
| $\beta'$-sialon-based powder (1.2μ) | | 30(wt.%) |
| Silicon | Particle size: 3–1mm | 40 |
| carbide | Particle size: 1–0.25mm | 20 |
| powder | Particle size: less than 0.25mm | 10 |
| Properties | | |
| Apparent porosity (%) | | 4.6 |
| Bulk specific gravity | | 2.88 |
| Shrinkage percentage at sintering (%) | | 7.1 |
| Bending strength (kg/cm$^2$) | | 505 |
| Molten Al immersion (at 1,000° C. for 5 days) | | Nothing erosion |
| Molten Cu immersion (at 1,300° C. for 5 hrs.) | | Nothing erosion |
| Undiluted hydrochloric acid immersion* (5 hours' boiling) | | −0.4 |
| Undiluted sulfuric acid immersion* (5 hours' boiling) | | 0 |
| 50% aqueous solution of NaOH* (5 hours' boiling) | | −0.2 |
| Oxidation-induced increase in weight (mg/cm$^2$) by heating in air at 1,200° C. for 40 hrs. | | 40 |

*Variation in weight (wt.%).

As may be clear from Table 6, the refractory product of the invention is highly outstanding in all the properties including strength, dimensional stability, corrosion resistance as against molten metals, chemical stability, and resistance to oxidation. Further, even with a large size, it suffered no cracks, exhibiting general homogeneity.

EXAMPLE 24

The same $\beta'$-sialon-based powder (mean particle size 1.2μ) as that of Example 23 and alumina powder having particle size distribution were mixed at the ratio as shown in Table 7, molded, and nitriding-sintered under the same conditions as those of Example 23, and thus obtained was a refractory product having $\beta'$-sialon as the bonding matris.

The properties of the refractory product obtained were found to be such as shown in Table 7.

TABLE 7

|  |  | Example 2 |
|---|---|---|
| Material powder | | |
| $\beta'$-sialon-based powder (1.2μ) | | 35(wt.%) |
| Alumina | Particle size: 3–1mm | 30 |
| powder | Particle size: 1–0.25mm | 20 |
|  | Particle size: less than 0.25mm | 15 |
| Properties | | |
| Apparent porosity (%) | | 7.7 |
| Bulk specific gravity | | 3.34 |
| Shrinkage percentage at sintering (%) | | 6.8 |
| Bending strength (kg/cm$^2$) | | 520 |
| Molten Al immersion (at 1,000° C. for 5 days) | | No erosion |
| Molten Cu immersion (at 1,300° C. for 5 hrs.) | | No erosion |
| Molten SUS 304 immersion (at 1,630° C. for 3 hrs.) | | Depth of erosion < 1mm |
| Undiluted hydrochloric acid immersion* (5 hours' boiling) | | −0.3 |
| Undiluted sulfuric acid immersion* (5 hours' boiling) | | 0 |
| 50% aqueous solution of NaOH* (5 hours' boiling) | | −0.3 |
| Oxidation-induced increase in weight (mg/cm$^2$) by heating in air at 1,200° C. for 40 hrs. | | 2.7 |

*Variation in weight (wt.%).

What we claim is:

1. A method for manufacturing a $\beta'$-sialon sintered material comprising the steps of
   (a) adding 10 to 1,000 wt. parts of metal silicon powder to 100 wt. parts of mixed powder composed of 20 to 80 wt.% silica powder and 80 to 20 wt.% aluminum powder and thoroughly mixing said powders to obtain a powderous starting material;
   (b) molding said powderous starting material into a green compact, and,
   (c) sintering said green compact in a nitrogenous non-oxidative gas atmosphere at a temperature of from about 1200° to about 1550° C. to form a $\beta'$-sialon sintered body.

2. The method as defined in claim 1 which further comprises the steps of
   (d) embedding the $\beta'$-sialon sintered body in a nonreactive filler powder and heating it in a nitrogenous nonoxidative gas atmosphere at a temperature of from about 1,600° to about 1,900° C.

3. The method as defined in claim 1 wherein step (a) further comprises mixing said powders with 0.2 to 10% by weight of at least one fine powder selected from the group consisting of alumina, silicon nitride, aluminum nitride, aluminum nitride polytype sialon and $\beta'$-sialon.

4. The method as defined in claim 1 which further comprises the steps of
   (f) pulverizing the sintered $\beta'$-sialon body and separating it into fine (less than 0.25 mm in diameter), medium (0.25–1 mm), coarse (more than 1 mm) powder fractions,
   (g) mixing the powder fractions to obtain a mixture,
   (h) molding the mixture into a compact body and
   (i) sintering the compact body in a nitrogenous non-oxidative gas atmosphere at a temperature of from about 1,600° to about 1,900° C.

5. The method as defined in claim 1 wherein step (a) further comprises mixing said powders with at least one powderous refractory aggregate selected from the group consisting of silicon carbide, alumina, mullite, zircon, zirconia, $\beta'$-sialon, aluminium nitride polytype sialon and silicon nitride.

6. The method as defined in claim 5 which further comprises the steps of
   (d) embedding the $\beta'$-sialon sintered body in a nonreactive filler powder and heating it in a nitrogenous nonoxidative gas atmosphere at a temperature of from about 1,600° to about 1,900° C.

7. The method as defined in claim 1 which further comprises the steps of
   (f') pulverizing the $\beta'$-sialon sintered body into a $\beta'$-sialon base powder having a mean particle size of 1.6μ or less,
   (g') molding said $\beta'$-sialon base powder into a compact body with the density of 1.7 g/cm$^3$ or more, and (h') sintering said compact body in a nitrogenous nonoxidative gas atmosphere at a temperature of from about 1,600° to about 1,900° C.

8. The method as defined in claim 7 wherein step (f') further comprises mixing said β'-sialon base powder with silicon nitride powder, aluminum nitride powder or mixtures thereof.

9. The method as defined in claim 7 wherein step (f') further comprises mixing the β'-sialon base powder with fine (less than 0.25 mm in diameter), medium (0.25–1 mm), coarse (more than 1 mm) powder fractions of another β'-sialon material.

10. The method as defined in claim 1 which further comprises the steps of (f") pulverizing the β'-sialon sintered body into a β'-sialon base powder having a mean particle size of 1.6μ or less, (g") molding said β'-sialon base powder into a compact body with the density of 1.7 g/cm³ or more, and (h") sintering said compact body in a nitrogenous nonoxidative gas atmosphere comprising first sintering the compact body at a temperature of from about 1,600° to about 1,900° C., and secondly further sintering it in the same atmosphere at a temperature of from about 1,500° to about 1,750° C. (at least 30° C. lower than the primary-sintering temperature) for a period of at least one hour.

11. The method as defined in claim 10 wherein step f" further comprises mixing said β'-sialon base powder with silicon nitride powder, aluminum nitride powder or mixtures thereof.

12. The method as defined in claim 7 wherein step (f') further comprises mixing said β'-sialon base powder with at least one powderous refractory aggregate selected from the group consisting of silicon carbide, alumina, mullite, zircon, zirconia, β'-sialon, aluminum nitride polytype sialon, and silicon nitride.

* * * * *